United States Patent [19]
Takahashi et al.

[11] Patent Number: 5,071,090
[45] Date of Patent: Dec. 10, 1991

[54] AIRSHIP

[75] Inventors: Masakatsu Takahashi, Ashiya; Ryotaro Takahashi, Tokyo; Kentaro Takahashi, Kusatsu, all of Japan

[73] Assignee: Kabushiki Kaisha HI Blidge, Osaka, Japan

[21] Appl. No.: 575,713

[22] Filed: Aug. 31, 1990

[30] Foreign Application Priority Data

Sep. 4, 1989 [JP] Japan .................. 1-228875

[51] Int. Cl.⁵ .............................. B64B 1/58
[52] U.S. Cl. .................. 244/029; 244/30; 244/125; 244/128
[58] Field of Search ............ 244/29, 30, 125–128, 244/55, 130

[56] References Cited

U.S. PATENT DOCUMENTS

| | | | |
|---|---|---|---|
| 1,109,502 | 9/1914 | Armstrong | 244/125 |
| 1,766,358 | 6/1930 | Rose | 244/29 |
| 1,998,380 | 4/1935 | Medoff | 244/125 |
| 3,346,216 | 10/1967 | Desmarteau | 244/30 |
| 3,620,485 | 11/1971 | Gelhard | 244/128 |

Primary Examiner—Joseph F. Peters, Jr.
Assistant Examiner—Linda L. Palomar
Attorney, Agent, or Firm—Armstrong, Nikaido, Marmelstein, Kubovcik & Murray

[57] ABSTRACT

An airship having improved controllability which comprises: an axial fluid pathway penetrating through a body of the airship in an axial direction, at least one radial fluid pathway crossing the axial fluid pathway and penetrating through the body in a radial direction, the axial fluid pathway and the radial fluid pathway forming a ventilating-thrusting tube having a rigid framework construction, propulsion means, thrust generating direction of which is adjustable, arranged in a crossing region of the axial fluid pathway and the radial fluid pathway, and a lift balloon arranged beside the ventilating-thrusting tube in such a manner that a gap is formed between the ventilating-thrusting tube and the lift balloon to allow air to flow through. This arrangement lowers a tendency of yawing due to a transverse wind. The airship has a semi-rigid and semi-flexible construction capable of making up for drawbacks of both rigid type and flexible type.

6 Claims, 6 Drawing Sheets

AIRSHIP

BACKGROUND OF THE INVENTION

The present invention relates to an airship capable of being easily controlled during taking off and landing, and more particularly to an airship the controllability of which is improved so that its taking off and landing can be controlled correctly and safely by means of a propulsion means to move the body of the airship up-down and right -left.

Recently there has been a great expectation of the future enhancement of an airship in the following respects:

(a) An airship does not require a large runway and a large airport, and it is free from a noise pollution problem and attains energy-saving considerably.

(b) An airship can satisfy a large demand for new transportation means in a region where usual transportation means are not economically feasible (for example, a region provided with no sufficient traffic facilities, where the mineral resources and the timber resources are to be developed and utilized)

(c) An airship provides a great effectiveness of advertising and publicity because of its capability of low speed navigation (d) An airship is suitable for a patrol of long time duration because of its capability of long time flight (e) An airship is now capable of navigating at a normal speed of 100 to 200 km/h and therefore, there is a possibility that an airship provides supplimentation or new exploitation for middle or long distance overland traffic means such as a taxi under a supersaturated condition, for overseas traffic means and for traffic means between solitary islands, so as to make the world traffic situation undergo a complete change.

On the other hand, there are some problems to be solved so that above-mentioned beneficial features of an airship can be utilized more easily and widely. An improvement of controllability during taking off and landing is one of the problems.

An airship is apt to be influenced by a wind because of its essential configurational feature that its body is big compared with its weight. Consequently, during taking off and landing when the controllability is lowered because of a lower speed than the cruising speed, a skillfull control is required to carry out quick taking off and landing to the predetermined position in order to minimize the influence of changes of wind.

However, the descending speed control of a conventional airship is usually performed by means of, for example, a change of the body weight by filling an inside compartment of the airship body with compressed air, and the response of the airship to the above-mentioned control is extremely slow. So the quick and accurate landing to the predetermined position has been difficult.

The present invention was made in view of above-mentioned problems in the conventional airship. An object of the present invention is to provide an airship improved in the controllability during taking off and landing. Another object of the present invention is to promote the utilization of airships removing one of large obstructing factors of the spread of airships.

SUMMARY OF THE INVENTION

The present invention provides an airship capable of taking off and landing quickly and accurately by employing particular arrangement of propulsion means and fluid pathway to facilitate altitude control and position control. The present invention is based on an entirely new concept which has not existed.

Namely, according to the present invention there is provided an airship having improved controllability which comprises:

an axial fluid pathway penetrating through a body of the airship in an axial direction, at least one radial fluid pathway crossing the axial fluid pathway and penetrating through the body in a radial direction, the axial fluid pathway and the radial fluid pathway forming a ventilating-thrusting tube having a rigid framework construction, propulsion means, thrust generating direction of which is adjustable, arranged in a crossing region of the axial fluid pathway and the radial fluid pathway, and a lift balloon arranged beside the ventilating-thrusting tube in such a manner that a gap is formed between the ventilating-thrusting tube and the lift balloon to allow air to flow through. This particular arrangement lowers a tendency that the airship yaws due to a transverse wind. Further the airship according to the invention has a semi-rigid and semi-flexible construction capable of making up for drawbacks of both rigid type and flexible type.

According to the present invention, a sharp improvement can be made in respect of the controllability of an airship during taking off and landing by virtue of the structure employing the axial fluid pathway, the radial fluid pathway and the propulsion means of thrust generating direction ajustable type arranged in the crossing region of the axial fluid pathway and the radial fluid pathway. Because this structure can improve not only the propulsion efficiency and the directional stability at cruising but also the response of the altitude control and the position control by controlling the thrust power and the thrust direction of the propulsion means.

The airship according to the present invention employs a structure in which air can flow through the gap between the framework of the ventilating-thrusting tube and the lift balloon, so the tendency of yawing due to the transverse wind is reduced. Further, since the airship has a semi-rigid and semi-flexible construction, a weak point of the rigid type is covered by a strong point of the flexible type and vice versa.

BRIEF DESCRIPTION OF THE DRAWINGS

Next, the airship according to the present invention is explained with reference to the accompanying drawings, in which.

DETAILED DESCRIPTION

Figure 1:
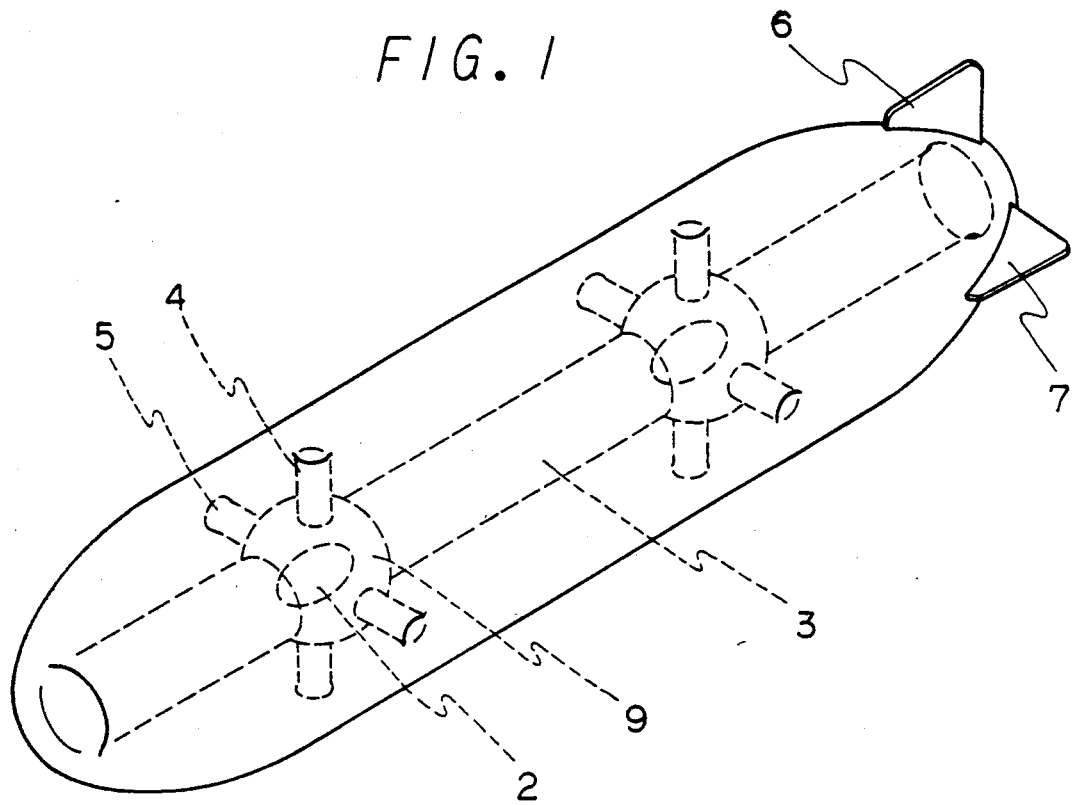
FIG. 1 is a perspective view showing an embodiment of the present invention.
Figure 2:
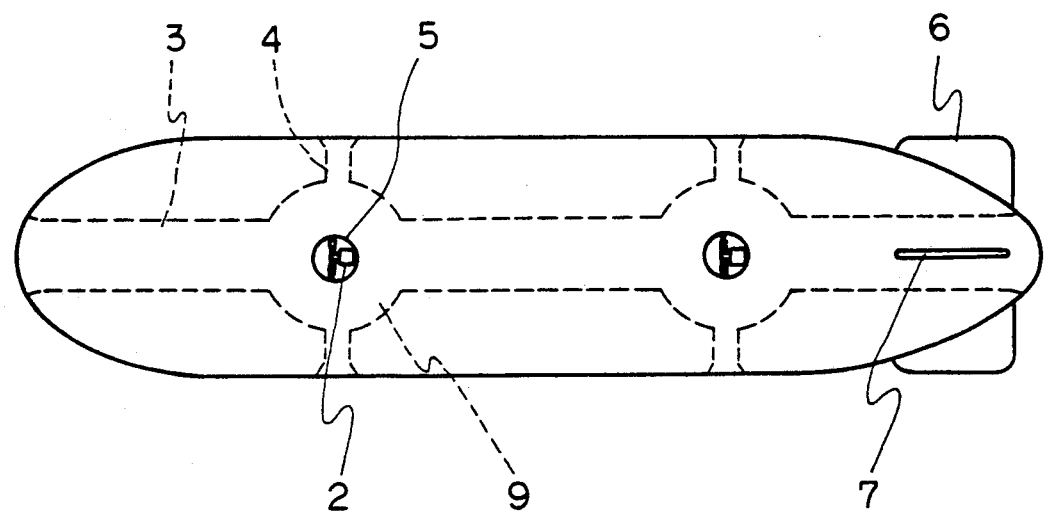
FIG. 2 is a side view of the airship shown in FIG. 1.

As shown in FIG. 1 and 2, a pair of horizontal tail assemblies and a pair of vertical tail assemblies are attached to the body (or to the framework) of the airship. The shapes of the body and the tail assemblies are designed, based on aerodynamics, so that the airship can cruise with the minimum air resistance. However, in FIG.1 and 2 the illustration is simplified for better comprehensibility, and the details of which is described later with reference to FIG. 3. At the lower part of the body, a control room and a cabin (not shown in the drawings) are usually arranged.

The embodiment shown in FIG. 1 and 2, an axial fluid pathway 3 passing through the body 1 is formed, and the axial fluid pathway 3 has two nodes 9 as shown in the drawings. The node has a slightly expanded inner diameter compared with the inner diameter of the pathway. Vertical radial fluid pathways 4 are arranged on above and below the node 9, and horizontal radial fluid pathways 5 are arranged on right and left sides of the node 9. Thus, the axial fluid pathway 3, the vertical radial fluid pathways 4, the horizontal radial fluid pathways 5 and nodes 9 form the framework 10 of the ventilating-thrusting tube. At the node 9, propulsion means 2, thrust generating direction of which is adjustable, is located.

The vertical radial fluid pathways 4 give a path which enables the body to move up and down. The horizontal radial fluid pathways 5 are provided so that the transverse posture of the body is well controlled and so that the capability of minimizing wind direction effect is improved.

In this embodiment, the propulsion means 2 can be an additional equipment to perform supplemental function provided additionally to the main engine and or it can be an equipment to perform as a main engine. The propulsion means 2 has a control mechanism (not shown in Figures) by which the thrust direction of the propulsion means can be adjusted suitably according to the operation condition of the body, for example, the altitude control operation, the position control operation or going ahead operation.

In the preferable embodiment, there is employed a structure in which wind velocity and wind direction sensors are provided on the surface of the body 1 and an additional function is added to the above-mentioned control mechanism to drive the propulsion means 2 with the thrust direction and the thrust power being suitably adjusted in such a manner that the propulsion means 2 can generate counter thrust, with quick response, against the air turbulence and cross wind based on the wind velocity and wind direction value detected instantly by the sensor.

As the propulsion means 2, equipment used in a conventional airship or an aircraft can be employed, and further any equipment which can be attached to airships and can generate thrust in above-mentioned desired direction can be employed.

Examples of the above-mentioned propulsion means are a jet engine (gas turbine), an aircraft engine driven propeller, a turbo fan, an exhauster, a blower, and a compressed air generator. Above all, propulsion means of lightweight and high power output and capable of providing easy thrust control is preferable.

Figure 3:
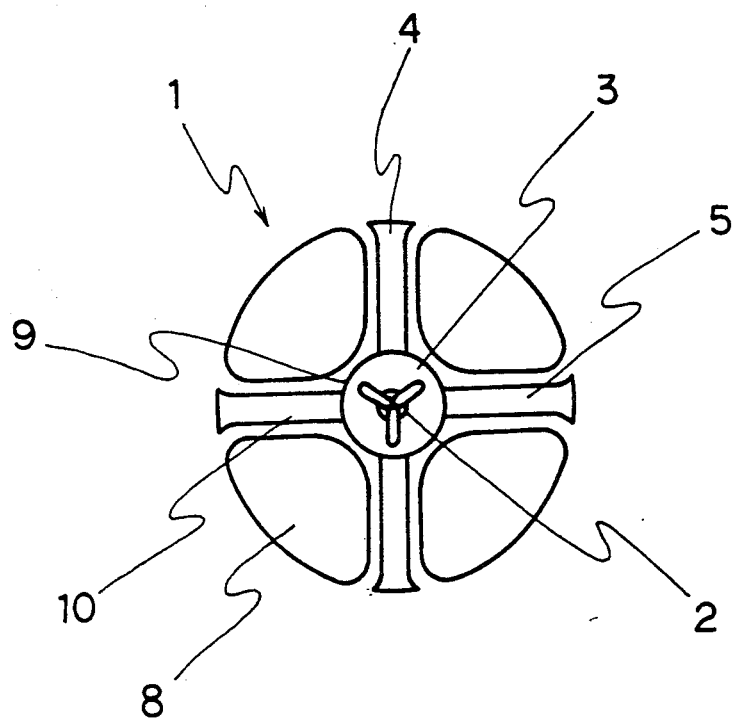
FIG. 3 is a schematic sectional view of the airship shown in FIG. 1 at the plane including the propulsion means, showing a structure in which air flows through a gap between the framework of the ventilating-thrusting tube and the lift balloon.

FIG. 3 is a schematic sectional view of the airship shown in FIG. 1 and 2 at a plane crossing the node 9. Wherein the lift balloon 8 is arranged in such a manner that a gap is formed between the lift balloon 8 and framework 10 of the ventilating-thrusting tube comprising the axial fluid pathway 3, the radial fluid pathways 4 and 5, so that air flow through the gap is permitted.

Figure 5:
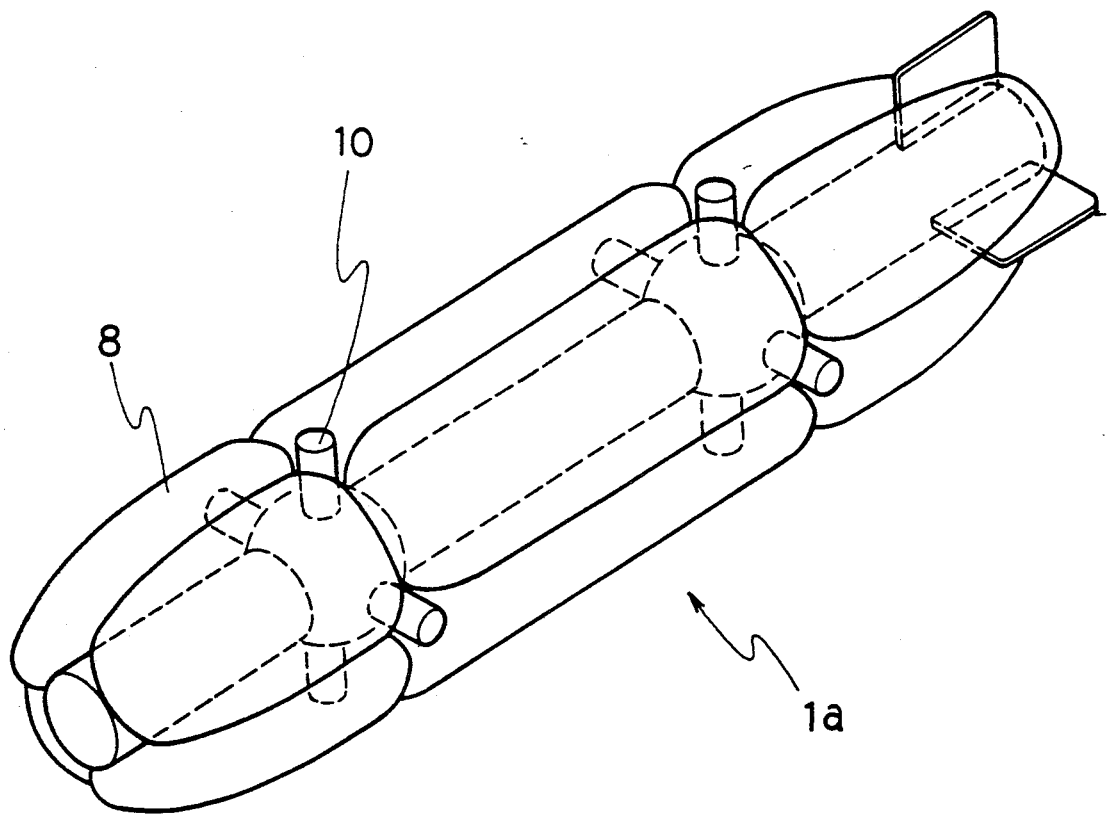
FIG. 5 is a perspective view showing a different embodiment of the airship according to the present invention.

With respect to the lift balloon 8, there can be employed a continuous structure to form whole body 1, or alternatively as shown in FIG. 5, there can be employed a divided structure wherein plural segmental balloons 8 are combined to form another type body 1a less influenced by cross wind or the like.

By virtue of the above-mentioned structure in which a path for air flow is arranged between the framework 10 of the ventilating-thrusting tube and the lift balloon 8, the airship according to the present invention reduces the tendency of yawing due to a cross wind and has a construction making up for drawbacks existing respectively in rigid type and flexible type.

According to the present invention, for example, an airship having a principal particulars listed below is constructed.

Figure 8:
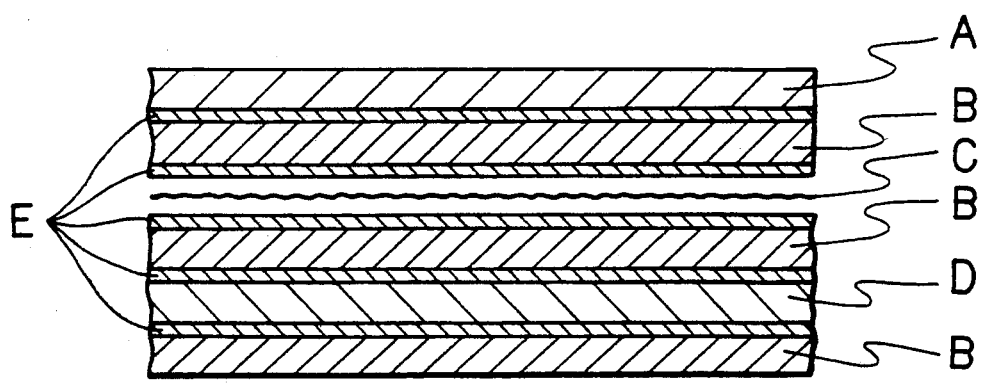
FIG. 8 is a sectional view of a lift balloon material used in the present invention.

Main Dimensions
    Overall length: 5 to 10 m
    Maximum diameter: 5 to 10 m
    Diameter of axial fluid pathway: 0.5 to 1 m
    Diameter of vertical radial fluid pathway: 0.5 to 1 m
    Diameter of horizontal radial fluid pathway: 0.5 to 1 m Material
    Lift balloon: The lift balloon used in the present invention has, for example, a structure as shown in FIG. 8 wherein,
        A represents an outer layer of high weather resistance material such as fluorine containing resins,
        B represents a layer of coating material such as flexible vinyl chloride and polyester,
        C represents a layer of foundation material such as allyl resin, ultra high-strength polyethylene and aramid fiber such as poly-p-phenyleneterephthalamide (PPTA),
        D represents a layer of gas barrier material such as ethylene and vinyl alcohol containing regins and
        E represents a layer of adhesive such as epoxy adhesives, isocyanate adhesives and acrylic adhesives.
    Balloon gas: He
    Framework: ACM (advanced composite material) e.g. a material using carbon fiber, FRP and so on.

Equipment
    Propulsion means: For example, reciprocating engine, turboprop engine and turboshaft engine. The output power is, for example, 100 to 1,000 horsepower.
    Means for adjusting the direction of the propulsion means: The propulsion means can be mounted on a separate control mechanism for example like a conventional scanning mechanism, or can have own control mechanism. Tiltable type thruster and inverting propeller can be employed so that better motional characteristics of the airship can be attained and that the airship can react quickly against a cross wind or a gust. Further, a ducted fan and a thruster engine can also be considered according to the circumstances.

Sensor for detecting a velocity and a direction of a wind: The sensor is connected to the control mechanism and respective engines by electrically or optically conductive means.

Figure 4:
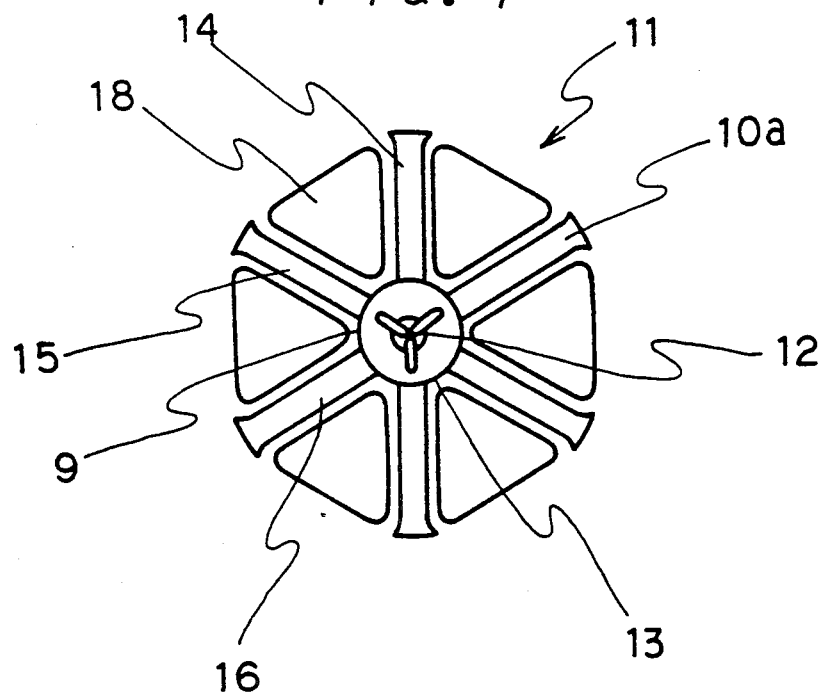
FIG. 4 is a schematic sectional view at the plane including the propulsion means, showing another embodiment of the present invention.

In the embodiment shown in FIG. 4, there is employed a body 11 having a cross sectional shape substantially equal to an equilateral hexagon. The body 11 having such a cross sectional shape like an equilateral hexagon is preferable in respect that the airship has high structural strength and is hard to be deformed. The embodiment shown in FIG. 4, there are provided an axial fluid pathway 13 penetrating through a body of the airship in an axial direction, a vertical radial fluid pathway 14 crossing the axial fluid pathway 13 and penetrating through the body 11 in a vertical direction and radial fluid pathways 15,16 crossing the axial fluid pathway and penetrating through the body 11 obliquely. In a crossing region (a node) of those pathway, the propulsion means 12 of thrust generating direction adjustable type is arranged. In this embodiment, similarly to the above-mentioned embodiment shown in FIG. 1, 2 and 3, the direction and the output of the propulsion means 12 can be adjusted according to the purpose such as going ahead, going astern, altitude control and position control, and as a result the controllability, during taking off and landing, of the airship is improved.

Further, in the embodiment shown in FIG. 4, the lift balloon 18 is arranged beside the framework 10a of the ventilating-thrusting tube comprising the axial fluid pathway 13 and the radial fluid pathways 14, 15 and 16 in such a manner that a gap is formed between the ventilating-thrusting tube and the lift balloon to allow air to flow through.

By virtue of the above-mentioned construction, the tendency that the airship yaws due to a transverse wind. And the airship has a semi-rigid and semi-flexible construction capable of making up for drawbacks of both rigid type and flexible type, namely the airship has neither the drawbacks of flexible type that, for example, the number and the position of cockpit, cabin and propulsion means are restricted, nor the drawbacks of rigid type, for example, it is unsuitable to apply to small-scale airships.

Figure 6:
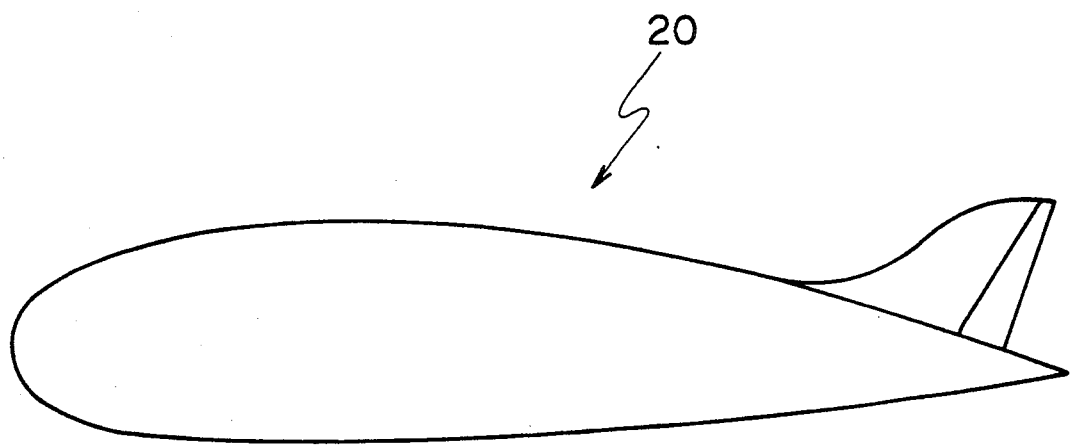
FIG. 6 is a profile of an airship body according to a different embodiment of the present invention.

The airship of the present invention can have a body profile like a wing profile (so-called lifting-body-type body profile). FIG. 6 shows an example of the lifting-body-type body profile. An airship body 20 having this profile generates lift when it goes ahead.

With respect to the cockpit and the cabin, it is preferable to employ a design in which the cockpit and the cabin are integratedly formed together with the frame work comprising the axial fluid pathway and the radial fluid pathway or additional overall framework using light, rigid, advanced composite material (such as a material using carbon fiber, FRP and the like). Such like design provides a rigid and reliable structure.

Figure 7:
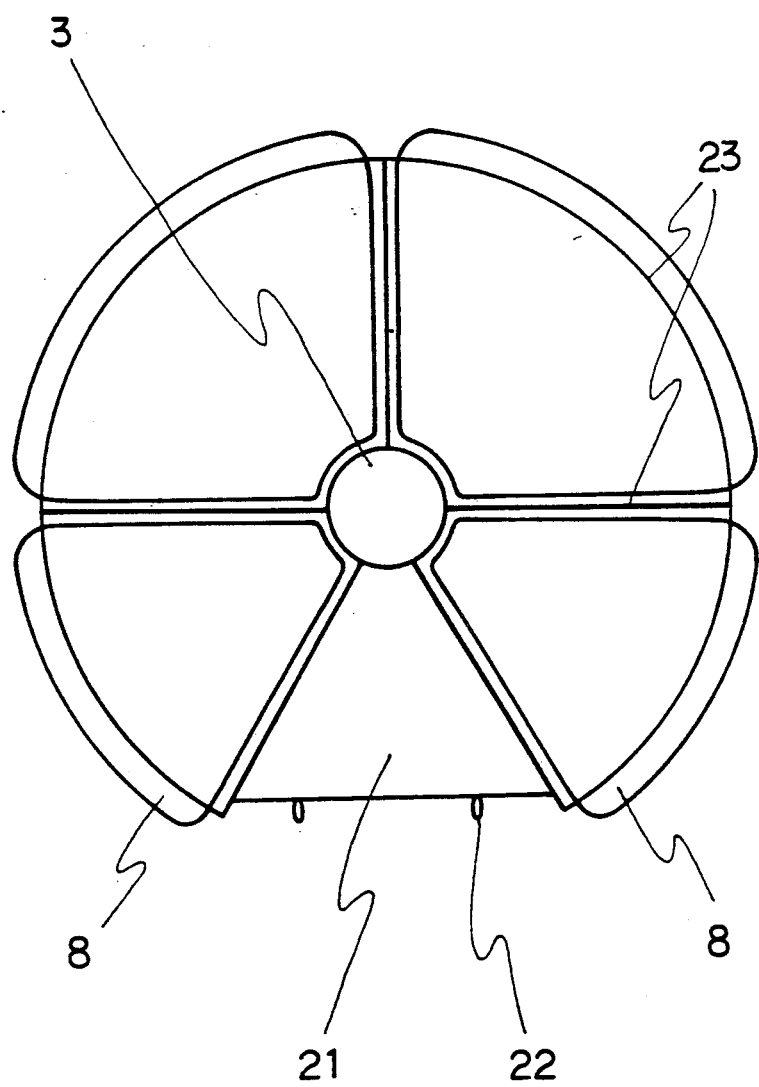
FIG. 7 is a schematic sectional view of a different embodiment of the present invention showing a cockpit and a cabin.

Further it is advantageous that, as shown in FIG. 7, the cockpit and the cabin 21 are arranged in the bottom of the body in order to improve the airship stability, and further the floor level of the cockpit and the cabin 21 is slightly elevated relative to the bottom of the lift balloons 8 on both sides in order to protect the cockpit and the cabin 21 even in the event of a landing accident. In FIG. 7, the numeral 3 represents an axial fluid pathway, the numeral 22 represents a wheel, and the numeral 23 represents an additional frame.

The total volume of the balloon is determined based on the requirement that the buoyancy generated by the balloon (e.g. 1 m³. He gas provides about 1 kg buoyancy) should cover the dead load (the total airship weight) plus the pay load. Thus, the size and the structure of an airship is subjected to this requirement.

Although the airship of the present invention has been explained hereinbefore with reference to the specific embodiments, the present invention is not limited to those embodiments. Namely various modifications and improvements are allowed as far as they do not deviate from the gist of the present invention. For example, the type of the airship can be close to a flexible type, semi-rigid type or rigid type, and further there is no limitation with regard to the location and the number of the fluid pathways.

As explained above, the airship according to the present invention is equiped with the axial fluid pathway and the radial fluid pathway and also with the propulsion means, thrust generating direction of which is adjustable, arranged in the crossing region of the pathways. So, the problem concerning the controllability of airships during taking off and landing, which has been one of the factors preventing airships from coming into wide use, can be solved. Additionally, the present invention brings further advantages that the airship of the present invention requires only a small space for taking off and landing, that the airship of the present invention is capable of taking off and landing quickly and correctly being less influenced by atmospheric conditions such as a wind or the like, and further that the construction in which air flows through the gap formed by the framework of the ventilating-thrusting tube and the lift balloon can lower the tendency of yawing due to a cross wind and also can make up for drawbacks of both rigid type and flexible type. Accordingly the present invention promotes a wide use of airships having many advantageous features. Described as above, there is a great possibility that the present invention contributes not only to the industrial developments but also to the development of the whole society in a wide sense.

What is claimed is:

1. An airship having improved controllability, comprises:
    an axial fluid pathway penetrating through a body of the airship in an axial direction,
    at least one radial fluid pathway crossing the axial fluid pathway and penetrating through the body in a radial direction, said axial fluid pathway and said radial fluid pathway forming a ventilating-thrusting tube having a rigid framework construction, wherein the intersection of the axial fluid pathway and the radial fluid pathway form a central point with an area radially extending from said central point having an increased inside diameter,
    propulsion means having a thrust generating direction which is adjustable, arranged directly at the central point, so that the thrust generating direction can be brought into agreement with one of said fluid pathways, and
    a lift balloon arranged beside the ventilating-thrusting tube wherein a gap is formed between the ventilating-thrusting tube and the lift balloon to allow air to flow therethrough.

2. The airship of claim 1, wherein the body of the airship is formed by a plurality of lift balloons.

3. The airship of claim 2, wherein:

a cockpit and a cabin are provided in the bottom of the airship body, at least two lift balloons are arranged on both sides of the cockpit, and the cockpit and the cabin have a floor level slightly elevated relative to the bottoms of the lift balloons on both sides.

4. The airship of claim 1, wherein the body of the airship has a cross sectional shape like a hexagon.

5. The airship of claim 1, wherein the body of the airship has a profile shape like a wing profile.

6. The airship of claim 1, wherein a cockpit and a cabin are integratedly formed together with the framework comprising the axial fluid pathway and the radial fluid pathway.

* * * * *